(12) United States Patent
Marukawa

(10) Patent No.: US 6,315,638 B1
(45) Date of Patent: Nov. 13, 2001

(54) METHOD OF CHEMICAL MECHANICAL TEXTURING

(75) Inventor: Takabumi Marukawa, Tokyo (JP)

(73) Assignee: Nihon Micro Coating Co., Ltd. (JP)

( * ) Notice: Subject to any disclaimer, the term of this patent is extended or adjusted under 35 U.S.C. 154(b) by 0 days.

(21) Appl. No.: 09/488,902

(22) Filed: Jan. 21, 2000

(30) Foreign Application Priority Data

Apr. 19, 1999 (JP) .................................................. 11-110318

(51) Int. Cl.$^7$ ...................................................... B24B 1/00
(52) U.S. Cl. .................................. 451/36; 451/41; 451/59
(58) Field of Search .............................. 65/61; 451/36, 451/41, 53, 59, 63

(56) References Cited

U.S. PATENT DOCUMENTS

| | | | |
|---|---|---|---|
| 3,685,218 | * | 8/1972 | Gambale et al. . |
| 5,580,667 | * | 12/1996 | Lal et al. ........................ 428/610 |
| 5,670,011 | * | 9/1997 | Togawa et al. .................. 156/345 |
| 5,775,977 | * | 7/1998 | Platzer et al. ...................... 451/37 |
| 5,899,794 | | 5/1999 | Shige et al. . |
| 5,931,718 | * | 8/1999 | Komanduri et al. .............. 451/36 |
| 6,120,361 | * | 9/2000 | Konishi et al. .................. 451/287 |
| 6,139,680 | * | 10/2000 | Chen et al. ...................... 156/345 |

* cited by examiner

*Primary Examiner*—Timothy V. Eley
(74) *Attorney, Agent, or Firm*—Coudert Brothers

(57) ABSTRACT

Minute and uniform line marks can be formed on the surface of a glass substrate for a magnetic disk by pressing a tape planted with hairs against the substrate surface and causing it to run thereover while supplying suspension containing abrading particles and a solution which contains hydroxyl groups such as a KOH solution.

3 Claims, 1 Drawing Sheet

METHOD OF CHEMICAL MECHANICAL TEXTURING

BACKGROUND OF THE INVENTION

This invention relates to a method of texturing the surface of a glass substrate for a magnetic disk.

The substrate of a magnetic disk has its surface mirror-polished first and then has it textured so as to have a specified surface roughness. The purpose of texturing is to form line marks on the substrate surface such that when it is used with a magnetic head, the floating distance of the magnetic head from the disk surface can be maintained dependably constant while the disk is rotating at a fast rate and also such that the magnetic head can be prevented from becoming adsorbed to the disk surface while the disk is stationary.

The texturing is usually carried out by supplying a suspension mixed with minute abrasive particles of diamond or alumina to the surface of the substrate while the latter is rubbed with a woven or unwoven tape or a tape with planted hairs. Textured line marks can thus be formed as these abrading particles are pressed on and rubbed against the substrate surface to mechanically grind it. Such a process for forming line marks is usually referred to as the chemical mechanical texturing.

Recently, glass substrates are coming to be used as commonly as substrates made of an aluminum alloy for producing magnetic disks, and these glass substrates are also required to have their surface or surfaces textured for the same reasons, that is, such that the floating distance of the magnetic head can be reduced and hence that the recording density of the magnetic disks as memory media can be increased.

Since glass substrates are hard, however, it has been considered difficult to form sufficiently minute and uniform line marks on a glass substrate by a mechanical texturing process.

SUMMARY OF THE INVENTION

It is therefore an object of this invention to provide a chemical mechanical texturing method by which minute and uniform line marks can be formed on the surface of a glass substrate for a magnetic disk.

The chemical mechanical texturing method embodying this invention, with which the above and other objects can be accomplished, may be characterized by the steps of pressing a tape planted with hairs against a surface of a glass substrate and causing it to run thereover while supplying thereonto a suspension containing abrading particles and a solution which contains hydroxyl groups.

If a method according to this invention is used, the solution in the suspension containing hydroxyl groups causes a solid phase reaction on the contact boundary surface between the abrading particles in the suspension and the surface of the glass substrate, thereby generating over this surface a substance which is different and the texturing process is carried out while this boundary surface portion is chemically and mechanically removed. Since the method makes use of this chemical reaction on the surface of the glass substrate caused by the solution containing hydroxyl groups in the suspension, deterioration or degradation due to the process is negligible and since work units of the process are extremely small, it is possible to form extremely small line marks.

The solution in the suspension containing hydroxyl groups serves not only to accelerate the chemical polishing process due to the solid-phase reaction which takes place over the contact surfaces between the abrading particles and the substrate surface but also as a coolant, absorbing the heat of friction due to the mechanical grinding process between the abrading particles and the glass substrate.

Examples of solution containing hydroxyl groups suitable for the purpose of this invention includes KOH and NaOH solutions.

DETAILED DESCRIPTION OF THE INVENTION

Figure 1:
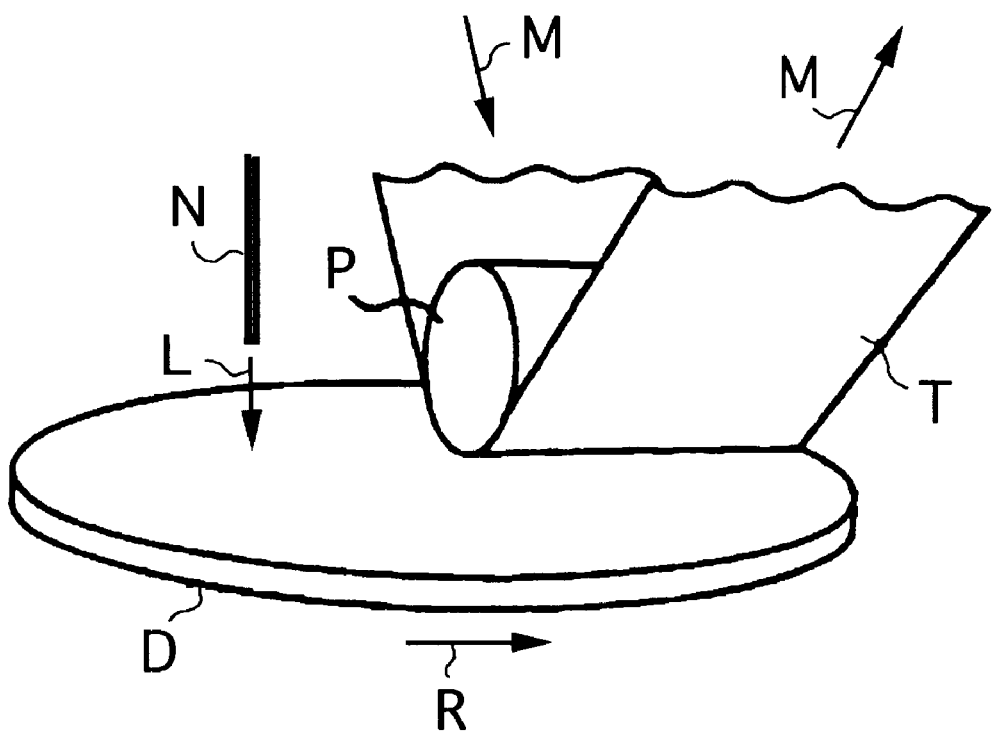
FIG. 1, which is incorporated in and forms a part of this specification, schematically illustrates a texturing machine which may be used in a method embodying this invention.

FIG. 1 shows a texturing machine which may be suitably used for the purpose of this invention.

A liquid suspension L containing abrading particles and hydroxyl groups is supplied through a nozzle N onto the surface of a glass substrate D while the glass substrate D is rotated in the direction indicated by arrow R and a tape T planted with hair is caused to travel in a reverse direction indicated by arrow M (opposite the direction R) and pressed against the surface by a rubber roller P to carry out a chemical mechanical texturing process. The glass substrate D is rinsed immediately after the tape T is retracted from the glass substrate D by flowing a rinsing liquid on the surface of the glass substrate D without removing it from the texturing machine.

Examples of the tape T which may be used for the purpose of this invention include those obtained by thinly applying a polyester or polyurethane type resin adhesive on the surface of a plastic film or a woven or non-woven cloth of plastic fibers comprising polyethylene terephthalate (PET) or polyurethane, planting piles of polyester, nylon or aramid of thickness 0.1–10 deniers and length 0.1–1.0 mm by a known electrostatic hair-planting method and slicing it into the form of a tape with a specified width. The thickness of the tape is usually 5 $\mu$m–5000 $\mu$m.

The liquid suspension to be used for the purpose of this invention may be obtained by adding a solution containing hydroxyl groups such as KOH and NaOH solutions into an aqueous solution in which abrading particles are dispersed. Examples of abrading particles suitable for the purpose of this invention include particles of diamond, silicon carbide, alumina and zirconia with diameters in the range of 0.01 $\mu$m–5 $\mu$m which are commonly used for grinding and polishing.

The invention is described next by way of the results of test and comparison experiments carried out by the inventor in which glass substrates for magnetic disks were textured and the surface roughness after the processing was measured.

For Test Experiment, use was made of a tape prepared by covering the surface of a PET film of thickness 75 $\mu$m with a polyurethane resin adhesive, planting thereon piles of nylon fibers with thickness 1.0 denier and length 0.6 mm by an electrostatic hair-planting method and slicing it into the shape of the tape. The suspension was prepared by adding 5 weight % of KOH to 95 weight % of aqueous solution containing diamond particles of diameter 2 $\mu$m (with 0.5 weight % of diamond particles and 99.5 weight % of pure water).

A polishing machine as shown in FIG. 1 was used under the following conditions:

Speed of rotation of the glass substrate =100 rpm;
Speed of travel of the tape =10 cm/min;
Hardness of the rubber roller =40;
Force of pressure =3.5 kg;
Suspension supply rate =8.0 ml/min; and
Time of polisher operation =30 seconds.

The surface roughness Ra of the glass substrate used for the texturing experiment was 4.0 Å before the polishing.

After the chemical mechanical texturing as described above, a scanning probe microscope (Nanoscope Dimension 3100 Series produced by Digital Instrument, Inc.) was used to scan (at 256 points) a randomly selected area of 30 $\mu$m×30 $\mu$m on the surface of the glass substrate. The measured average surface roughness over this selected area was 5.9 Å.

The surface condition of the glass substrate was observed and it was ascertained that textured line marks were uniformly formed thereon.

Next, three comparison experiments were carried out as follows by using the same polishing machine as shown in FIG. 1 and glass substrates with initial surface roughness Ra also equal to 4.0 Å. For each of these comparison experiments, too, the average surface roughness of the glass substrate was measured over a randomly selected surface area of 30 $\mu$m×30 $\mu$m after the grinding.

In Comparison Experiment 1, instead of the suspension used in Test Experiment, another suspension not containing any solution with hydroxyl groups (with 0.5 weight % of diamond particles and 99.5 weight % of pure water) was used for the mechanical grinding of a surface of a glass substrate. A tape of the same kind as used in Test Experiment was used again in Comparison Experiment 1. The surface roughness Ra after the texturing was 3.9 Å. Line marks were not formed uniformly on the polished substrate surface. What was accomplished was that the substrate surface was polished to an approximately uniform surface roughness.

In Comparison Experiment 2, instead of the tape used in Test Experiment, a woven tape of thickness 75 $\mu$m made of PET fibers was used with the same suspension used in Test Experiment to carry out a chemical mechanical texturing on a glass substrate. The surface roughness Ra after the texturing was 4.1 Å. Neither in Comparison Experiment 2 were line marks uniformly formed and the substrate surface was polished only to an approximately uniform surface roughness.

In Comparison Experiment 3, instead of the tape used in Test Experiment described above, a woven tape identical to the one used in Comparison Experiment 2 was used with the same suspension not containing any hydroxyl group as used in Comparison Experiment 1. The surface roughness Ra after a similar mechanical texturing process was 3.6 Å, and no uniform line marks were formed. Again, the substrate surface was polished only to an approximately uniform surface roughness.

The results of these experiments clearly show that if a suspension containing abrading particles and hydroxyl groups is used when a texturing process is carried out by means of a tape planted with hairs, uniform line marks can be formed on the surface of a glass substrate.

What is claimed is:

1. A method of chemical mechanical texturing comprising the steps of:

supplying a suspension comprising abrading particles and a solution containing hydroxyl groups onto a surface of a glass substrate; and simultaneously pressing a tape planted with hairs onto said surface and causing said tape to travel over said surface.

2. The method of claim 1 wherein said solution comprises KOH.

3. The method of claim 1 wherein said abrading particles have diameters 0.01 $\mu$m–5 $\mu$m.

* * * * *